United States Patent Office 3,425,838
Patented Feb. 4, 1969

3,425,838
ARTIFICIAL FEEDSTUFF FOR SILKWORM LARVAE CONTAINING A HYDROXYBENZALDEHYDE COMPOUND
Masaki Kamada, Osaka, and Tetsuo Okauchi, Hirakata, Japan, assignors to Takeda Chemical Industries, Ltd., Osaka, Japan
No Drawing. Filed Feb. 17, 1966, Ser. No. 528,091
Claims priority, application Japan, Feb. 18, 1965, 40/9,501
U.S. Cl. 99—2                    10 Claims
Int. Cl. A23k 1/18

ABSTRACT OF THE DISCLOSURE

Promoting the intake of an artificial feedstuff and growth of silkworm larvae by incorporating hydroxybenzaldehyde having at least one hydroxy group at the 3- or 4-position of the benzene ring in the feedstuff.

---

This invention relates to a method for promoting the intake of artificial feedstuff for silkworm larvae by silkworm larvae, and to the artificial feedstuff itself. More particularly, this invention relates to the method which comprises feeding to silkworm larvae an artificial diet containing hydroxybenzaldehyde having at least one hydroxyl group at 3- or 4-position of the benzene ring, and to the said artificial diet.

While silkworm larvae are known to be monophagous in eating no natural food but mulberry leaves, no exact reason for this has been made clear. Hamamura and his collaborators have found that mulberry leaves contain such factors as "the attracting factor" which attracts silkworm larvae (terpenes such as citral, linalyl acetate, linalool, terpinyl acetate), "the biting factor" which stimulates silkworm larvae to bite ($\beta$-sitosterol with or without flavonoids such as quercetin, morin, rutin, isoquercitrin), "the swallowing factor" which stimulates silkworm larvae to continuously bite and swallow (cellulose powder), and sugar such as sucrose, fructose, glucose and inorganic phosphate such as potassium dihydrogen phosphate, dipotassium hydrogen phosphate, sodium dihydrogen phosphate, disodium hydrogen phosphate, calcium phosphate, and that these factors are indispensable for the feeding of silkworm larvae. Conditions of the feedstuff, e.g. taste and nutritional value, are inferred to be of merely secondary significance in a strict sense for inducing silkworm larvae to eat, though these conditions should certainly be considered in connection with the growth of the larvae.

Further it was found that choline or its derivatives such as choline chloride, acetylcholine chloride, phosphorocholine calcium, lecithin and benzoylcholine chloride; or nucleic acid or its derivatives such as nucleotides e.g. adenylic acid, adenosine diphosphate, adenosine triphosphate, guanylic acid, cytidylic acid, and inosinic acid; nucleosides e.g. adenosine, guanosine, uridine, cytidine and inosine; and nucleic acid bases e.g. adenine, guanine, cytosine, uracil and hypoxanthine, have an effect on the metamorphosis of silkworm larvae. Hamamura et al. have previously discovered that chlorogenic acid, gallic acid, etc., constitute effective feed-intake promoting factor for silkworm larvae.

The present invention depends on the discovery that in the feeding and rearing of silkworm larvae on an artificial diet, i.e. one not solely composed of mulberry leaves, hydroxybenzaldehyde having at least one hydroxyl group at the 3- or 4-position of the benzene ring has a more remarkable effect than chlorogenic acid, gallic acid, etc. in urging silkworm larvae to eat and in promoting their growth.

One of the objects of this invention is to promote the urge for silkworm larvae to eat an artificial feedstuff. Another object of this invention is to promote the growth of silkworm larvae reared on an artificial feedstuff. A further object of this invention is to provide an artificial feedstuff which contains hydroxybenzaldehyde having at least one hydroxyl group at the 3- or 4-position of the benzene ring.

Hydroxybenzaldehyde employed in the present invention is benzaldehyde having an OH group at either the 3- or 4-position of the benzene ring or at both the 3- and 4-positions; in addition the hydroxybenzaldehyde may have another one or more hydroxyl groups at another position or positions of the benzene ring.

As the hydroxybenzaldehyde, there may, for example, be used protocatechualdehyde,
3,4,5-trihydroxybenzaldehyde,
2,3-dihydroxybenzaldehyde,
2,4-dihydroxybenzaldehyde,
4-hydroxybenzaldehyde and
2,4,6-trihydroxybenzaldehyde.

Among these hydroxybenzaldehydes, polyhydroxybenzaldehydes having not less than two hydroxyl groups are desirable, and those which have an OH group at the 4-position and another OH group at the 2- or 3-position are most preferable.

Any hydroxybenzaldehyde can be used irrespective of whether it has been produced synthetically or is contained in natural substance. In so far as the natural substance may contain ingredients which silkworm larvae do not like to eat, these are preferably removed.

In most cases, the effect of hydroxybenzaldehyde, when employed together with flavonoid such as morin, $\beta$-sitosterol, etc., can be heightened so that the net effect is equivalent to the case wherein the silkworm larvae are reared on merely mulberry leaves.

For practical application, the hydroxybenzaldehyde is utilized with conventional artificial diets, i.e. together with e.g. terpenes (which may however be omitted), $\beta$-sitosterol with or without flavonoids, cellulose powder, choline, nucleic acid or its derivatives, chlorogenic acid, etc., and sugar, inorganic phosphate, inorganic silicate, inositol, etc. As components of such diets, which are helpful for the growth of silkworm larvae, there may, for example, be used agar-agar, sodium carboxymethylcellulose, methylcellulose, alginic acid; soybean powder, parched bean flour, defatted soybean powder, bean curd, dried fermented soybean powder, defatted and dried bean paste; cereal flour such as rice flour, barley flour, wheat flour, etc.; yeast products such as dry yeast, yeast extract, extracted fluid of yeast, extracted yeast cake; straw ashes; and fish meal. These also serve as carrier. Further there may be included the following nutritious components for the growth of silkworm larvae:

Animal or plant proteins;
Amino acids such as glutamic acid, aspartic acid, leucine, lysine, tryptophane, valine, serine, proline, glycine, alanine, isoleucine, phenylalanine, arginine, methionine, threonine, or their salts;
Vitamins such as pantothenic acid, nicotinic acid, vitamin $B_1$, vitamin $B_2$, vitamin $B_6$, vitamin $B_{12}$, vitamin C, vitamin D, biotin, folic acid, vitamin K, vitamin E, vitamin P, inositol, orotic acid, $\alpha$-lipoic acid;
Inorganic salts such as calcium carbonate, sodium carbonate, sodium hydrogencarbonate, sodium chloride;
Honey, beehive honey or honey products;
Pectin;
Enzymes such as diastase, papain, trypsin;
Preservatives such as sodium dehydroacetate, vitamin $K_3$, sodium sorbate;

Antibiotics such as tetracycline, chlortetracycline, oxytetracycline, streptomycin, dihydrostreptomycin, neomycin, kanamycin, picromycin, leucomycin, erythromycin, oleandomycin, trichomycin, chloramphenicol, penicillin;

Sulfa drugs such as sulfaisomidine, sulfaisoxazole;

Furan derivatives such as nitrofuran; and

Glucuronic acid or its salts such as sodium salt, potassium salt, calcium salt, ammonium salt, organic amine salt, glucuronic acid ethyl ester, glucuronic acid amide, 2-amino-2-desoxy-D-glucuronic acid or its salts, N-glucuronosyl-glucosamine or its salts.

The quantity of hydroxybenzaldehyde added to an artificial diet may be varied depending on various conditions such as the instar or state of the silkworm larvae as well as the kind or quantity of other components in the artificial diet. Generally, it is preferable to employ 1 to 10 milligrams of hydroxybenzaldehyde per 1 gram of the dried artificial diet. In most cases, the hydroxybenzaldehyde is employed in about 5 to 10 milligrams per 1 gram of the dried artificial diet to the 1st and 2nd instar larvae, in about 2.5 to 5 milligrams to the 3rd and 4th instar larvae, and in about less than 2.5 milligrams to the 5th instar larvae.

The following examples set forth presently preferred embodiments of the invention. In these examples, "part(s) by weight" is referred to as "part(s)."

EXAMPLE 1

Silkworm larvae: Newly hatched larvae ($F_1$ hybrid of Gunko x Banri)

DIET

Diet 1:                                               Parts
  Defatted soybean powder _____ 29
  Sucrose _____ 9
  Potato starch _____ 15
  Cellulose _____ 40
  Agar _____ 2
  β-Sitosterol _____ 2
  Inositol _____ 0.5
  Vitamin mixture (consisting of vitamin $B_1$.HCl,
    vitamin $B_2$, vitamin $B_6$, nicotinic acid, calcium
    pantothenate, folic acid, biotin, and vitamin
    $B_t$ in the weight ratio of 10:10:10:20:20:2:
    2:10) _____ 0.5
  Wesson's minerals (consisting of NaCl, KCl,
    $KH_2PO_4$, $Ca_3(PO_4)_2$, $CaCO_3$, $FePO_4$, $MgSO_4$,
    $KAl_2(SO_4)_3.12H_2O$, $CuSO_4$, $MnSO_4$ and KI
    in the weight ratio of 52.5:60.0:15.5:74.5:
    10.5:7.4:45.0:0.05:0.2:0.1:0.03) _____ 1.5
  Vitamin C _____ 1.0
  Choline chloride _____ 0.1
  $K_2HPO_4$ _____ 0.5
  Dihydrostreptomycin _____ 0.1
  Mulberry leaves powder _____ 20

Diet 2: Diet 1 plus 50 milligrams of chlorogenic acid per 10 grams of Diet 1.

Diet 3: Diet 1 plus 50 milligrams of protocatechualdehyde per 10 grams of Diet 1.

*Results*

| Diet | Number of silkworm larvae tested | Rate of surviving silkworm larvae on the 4th day, percent | Rate of the 2nd instar silkworm larvae on the 4th day, percent | Mean body weight on the 5th day (milligrams) | Rate of surviving silkworm larvae at the 11th day | Rate of the 4th instar silkworm larvae on the 11th day | Days required for half of the larvae to arrive at the 5th instar |
|---|---|---|---|---|---|---|---|
| 1 | 262 | 100 | 88.7 | 16.3 | 100 | 0 | 21 |
| 2 | 212 | 100 | 97.7 | 15.5 | 98.8 | 13.9 | 18 |
| 3 | 212 | 100 | 96.7 | 22.2 | 100 | 92.5 | 16 |

The results show that the effect of protocatechualdehyde is superior to that of chlorogenic acid.

EXAMPLE 2

Silkworm larvae newly hatched were reared for one week on Diets 4 and 5, the components of which are shown listed below, and the number of silkworm larvae which reach the 2nd instar are observed.

Diet 4:                                               Parts
  Cellulose powder _____ 5.0
  Defatted soybean powder _____ 2.3
  Starch _____ 1.0
  Sucrose _____ 1.0
  Agar _____ 0.2
  Wesson's minerals _____ 0.15
  Vitamin mixture _____ 0.04
  Vitamin C _____ 0.05
  β-Sitosterol plus inorganic phosphate _____ 0.25
  Linoleic acid _____ 0.15
  Acetylcholine _____ 0.01
  Dihydrostreptomycin _____ 0.01
  Distilled Water _____ 20

Diet 5: Diet 4 plus 0.05 part of protocatechualdehyde.

| Diet | Number of silkworm larvae tested | Number of silkworm larvae reaching the 2nd instar during 7 days | Rate of larvae reaching the 2nd instar during 7 days, percent |
|---|---|---|---|
| 4 | 325 | 112 | 34.5 |
| 5 | 324 | 179 | 55.2 |

EXAMPLE 3

Silkworm larvae newly hatched are reared on Diets 6 and 7, the components of which are shown below, and the rate of silkworm larvae which reach the 2nd instar on the 5th day and 4th instar on the 14th day, and the means body weight of silkworm larvae on 14th day are observed.

Diet 6:                                               Parts
  Cellulose powder _____ 2.7
  Defatted soybean powder _____ 3.4
  Starch _____ 1.1
  Sucrose _____ 0.8
  Agar powder _____ 0.2
  Wesson's minerals _____ 0.04
  Vinamin mixtures _____ 0.05
  β-Sitosterol and inorganic phosphate _____ 0.1
  Mulberry leaves powder _____ 1.5
  Linoleic acid _____ 0.05
  Chlorine Chloride _____ 0.01
  Dihydrostreptomycin _____ 0.01
  Distilled water _____ 20

Diet 7: Diet 6 plus 0.05 part of protocatechualdehyde.

| Diet | Number of silkworm larvae tested | Number of silkworm larvae which reach the 2nd instar | Rate of silkworm larvae reaching the 2nd instar on the 5th day, percent | Rate of silkworm larvae reaching the 4th instar on the 14th day, percent | Mean body weight of silkworm larvae reaching the 4th instar on the 14th day, milligrams |
|---|---|---|---|---|---|
| 6 | 325 | 139 | 42.8 | 0.71 | 53.1 |
| 7 | 357 | 268 | 75.1 | 42.7 | 130.3 |

Protocatechualdehyde is used in the foregoing examples as a typical hydroxybenzaldehyde. Essentially similar results are obtained in the same way when replacing the protocatechualdehyde by any other of the precedingly named hydroxybenzaldehydes.

The artificial feeds listed in the examples are solely illustrative, and can be replaced by any other conventional artificial feed for silkworm larvae. The larvae are fed in per se conventional manner.

Having thus disclosed this invention, what is claimed is:

1. A method for promoting (a) the intake by silkworm larvae of an artificial feedstuff for silkworm larvae and (b) the growth of silkworm larvae, which comprises feeding silkworm larvae feedstuff containing hydroxybenzaldehyde having at least one hydroxyl group at the 3- or 4-position of the benzene ring.

2. A method according to claim 1, wherein the hydroxyybenzaldehyde contains not less than two hydroxyl groups, at least one hydroxyl group being at the 3- or 4-position of the benzene ring.

3. A method according to claim 1, wherein the hydroxybenzaldehyde contains two hydroxyl groups, one of which is at the 4-position and the other of which is at the 3- or 2-position of the benzene ring.

4. A method according to claim 1, wherein the amount of hydroxybenzaldehyde is approximately 0.1 to 1% by weight relative to the total weight of the dried artificial diet.

5. Artificial feedstuff for silkworm larvae, said feedstuff containing hydroxybenzaldehyde having at least one hydroxyl group at 3- or 4-position.

6. Artificial feedstuff for silkworm larvae, according to claim 5, wherein the hydroxybenzaldehyde contains not less than two hydroxyl groups, at least one hydroxyl group being at the 3- or 4-position of the benzene ring.

7. Artificial feedstuff for silkworm larvae, according to claim 5, wherein the hydroxybenzaldehyde contains two hydroxyl groups, one of which is at the 4-position and the other of which is at the 3- or 2-position of the benzene ring.

8. Artificial feedstuff for silkworm larvae, according to claim 5, wherein the amount of the hydroxybenzaldehyde is 0.1 to 1 % by weight relative to the total weight of the dried artificial feedstuff.

9. A method according to claim 1, wherein the hydroxybenzaldehyde is protocatechualdehyde.

10. Artificial feedstuff for silkworm larvae, according to claim 5, wherein hydroxybenzaldehyde is protocatechualdehyde.

References Cited

UNITED STATES PATENTS 3,328,170   6/1967   Hamamura et al. _____ 99—2

A. LOUIS MONACELL, *Primary Examiner.*

NORMAN ROSKIN, *Assistant Examiner.*